Feb. 16, 1937.  W. W. HIGHAM  2,070,659
COMPRESSOR VALVE
Filed Aug. 15, 1935  2 Sheets-Sheet 1
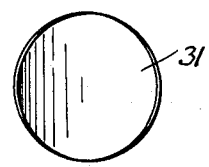
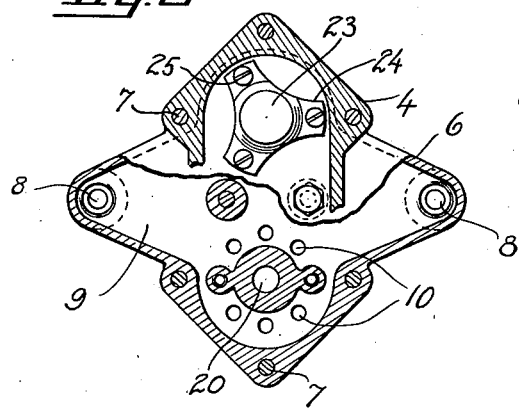
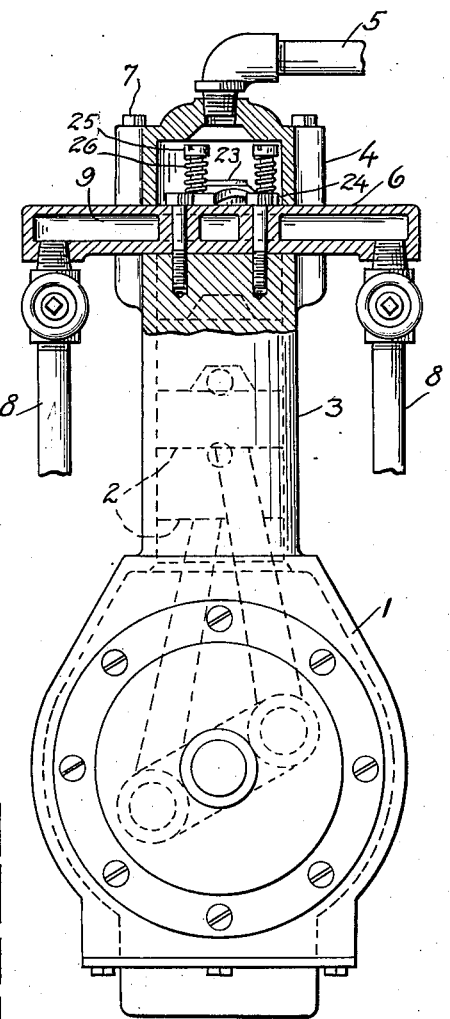
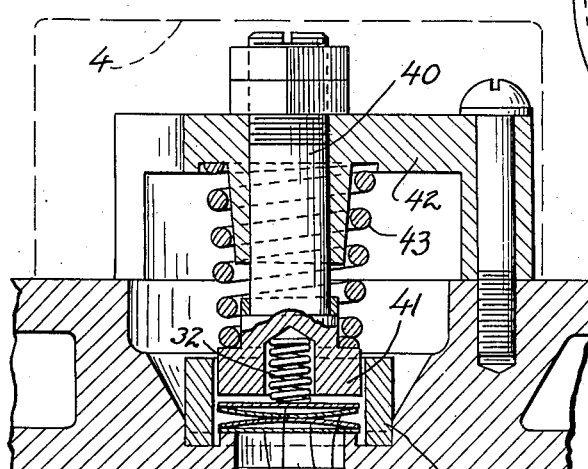
INVENTOR.
WILLIAM W. HIGHAM
BY
Barnes, Kisselle, Laughlin & Raisch
ATTORNEYS.

Feb. 16, 1937.   W. W. HIGHAM   2,070,659
COMPRESSOR VALVE
Filed Aug. 15, 1935   2 Sheets-Sheet 2

INVENTOR.
WILLIAM W. HIGHAM
BY
ATTORNEYS

Patented Feb. 16, 1937

2,070,659

UNITED STATES PATENT OFFICE 2,070,659

COMPRESSOR VALVE

William W. Higham, Detroit, Mich., assignor to Universal Cooler Corporation, Detroit, Mich., a corporation of Michigan Application August 15, 1935, Serial No. 36,362

11 Claims. (Cl. 251—119)

This invention relates to a compressor valve structure and is concerned particularly with a structure useful in compressors of mechanical refrigerators.

The principal object of the invention is the provision of an improved valve and valve structure by means of which a silent operation is obtained and which is of such a structure that manufacture and assembly thereof is materially facilitated in that fine adjustments as to tension, etc., need not be made either at initial installation or in servicing. Thus the invention seeks to provide a valve which is efficient and silent in operation and yet one which is not "fussy" and needs no attention or adjustment. In fact, the tension adjustment is obtained automatically by merely selecting springs of the desired tension.

In the accompanying drawings:

Fig. 1 is a general view of a compressor illustrating some of the head parts in section.

Fig. 2 is a view taken through parts of the valve plate showing some of the parts in section.

Fig. 4 is a plan view of one of the valve elements.

Fig. 5 is a view similar to Fig. 3 illustrating a modified form.

Figure 3:
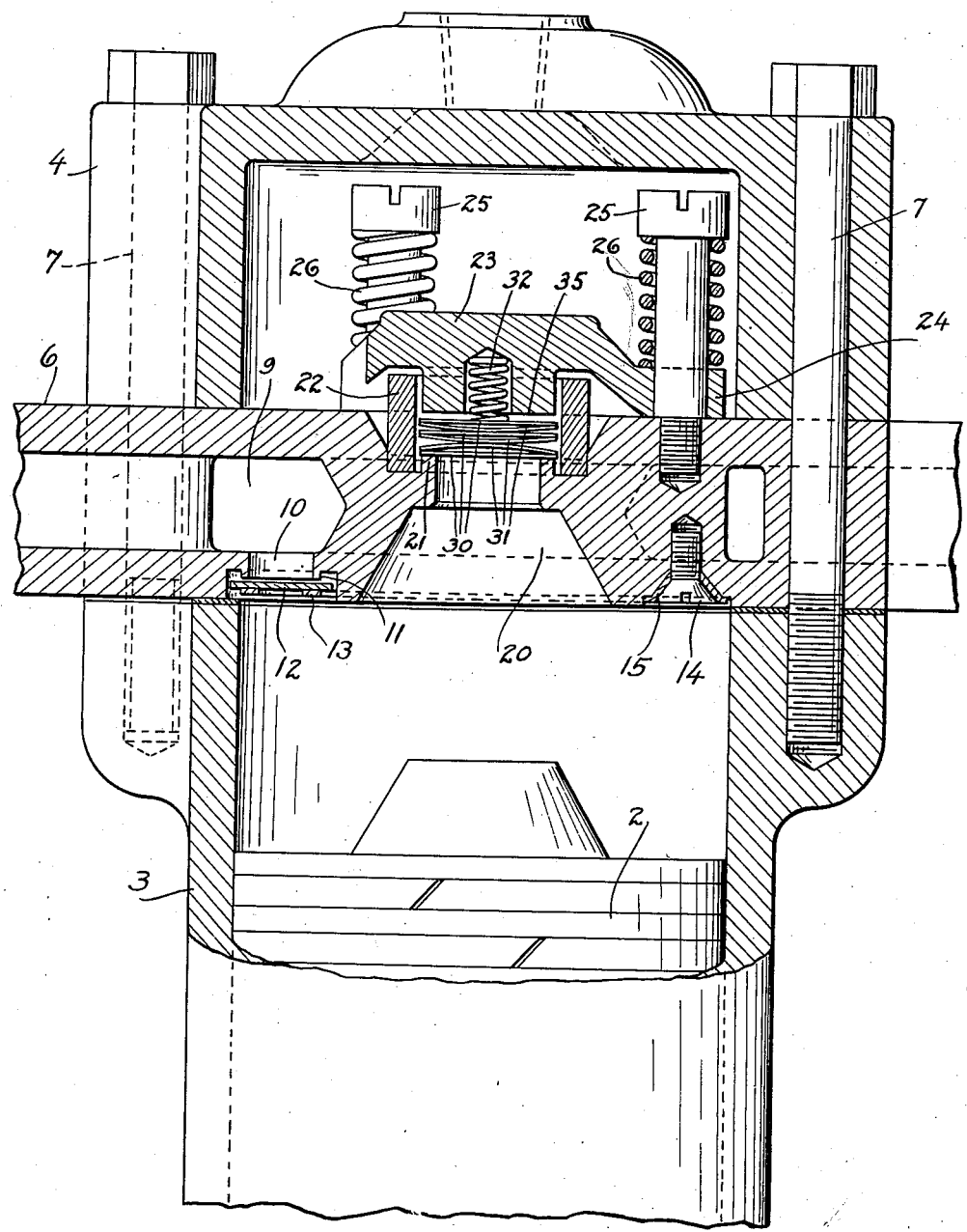
Fig. 3 is a large view illustrating the detail structure of the valve.

The valve referred to is a valve which controls the exhaust line of the compressor mechanism. The compressor shown in Fig. 1 has a crank case 1 with the usual crank, connecting rods and piston therein, the piston being shown at 2, and operating in the cylinder 3. The cylinder head is shown at 4, connected to which is an outlet pipe 5 for refrigerant, while a plate, which may be termed the valve plate 6, is disposed between the head and cylinder and secured as by means of cap screws 7. In the form shown, the inlet comprises conduits 8 connecting into the valve plate, which has a hollow passageway 9. Between the passageway 9 and the cylinder (Fig. 3) is an inlet valve structure, and this, of course, may be of any suitable form. As shown, the valve plate is provided with a series of apertures 10 (Fig. 2), each of which is equipped with a valve seat 11 and controlled by a freely floating flap valve 12. The several flap valves, one for each aperture 10, are held in position by a ring 13 secured to the valve plate by screws 14, the ring having depressed or countersunk parts 15 for this purpose. This type of inlet valve structure is covered in detail in my Patent No. 2,025,240. Of course, the exhaust valve, soon to be described, may be used with any kind of an inlet valve structure, but this inlet valve structure as shown herein is one suitable in form. When the piston moves downwardly in the cylinder, gasified refrigerant is drawn in through the ports 10, and when the piston moves upwardly in the cylinder, the valves 12 close these ports and the charge is compressed.

The compressor shown herein has two cylinders, although only one is necessary, and two inlet valve arrangements and exhaust valve structures are shown. The valve plate 6 is provided with an exhaust port 20, the lower part of which may be enlarged, and the piston may have an enlargement for fitting into the same, and a circumferential valve seat 21. Surrounding the valve seat there may be a guide ring 22, which may be press-fitted into a recess in the valve plate. The valve structure is held assembled by means of a cage or spider 23, which in the present instance has three legs 24 seating upon the valve plate and held in position by machine screws 25 through the means of interposed coil springs 26.

The structure of the valve which functions in the normal operation of the machine comprises flexible or spring-like members, preferably of disc form, and which are distortable to open the valve port, in combination with a second spring element of less strength than the flexible discs. The valve structure may be built up of a plurality of discs, some of which are distorted and others of which are substantially flat. As shown in Fig. 3, there is one flat disc 30 serving to close the port and cooperating with the seat 21, a pair of distorted discs 31 advantageously located back to back. A second and a third flat disc 30 may be used and between which is another distorted disc 31. These are acted upon by a coil spring 32. One distorted disc is shown in Fig. 4, the same being bent or angularly fashioned substantially on a diametrical line, as illustrated. The cage 23 has an inverted stop portion 35, the purpose of which will presently appear.

The particular arrangement of the several discs 30 and 31 is subject to variation and they may be arranged and used in such numbers as to obtain the best results under certain conditions. For example: In Fig. 5 only two flat discs 30 are used, separated by two distorted discs 31 placed back to back. Also in the form shown in Fig. 5, the valve structure is varied in that instead of a cage 23 there is a stud 40 having a head 41 and a separate cage 42 with a coil spring 43 disposed between the head of the stud and the cage 42.

Before describing the operation of this structure it would probably be well to go further into the description of the relative strength of the several spring agencies. The spring 32 is a very light spring, relatively speaking, although it is a subject of considerable variation. In one structure, which may be given as an example here, the spring 32 was collapsed to a point where the upper disc 30 contacted with seat 35 at a pressure of about eight ounces. The distortable discs, of course, may be flattened out by pressure. In this example the distorted discs 31 required about six pounds to reduce them to a flattened condition. These discs had a diameter of about .550 of an inch, were about .015 of an inch thick, and the distortion or warp was to a depth of about .020 of an inch.

In the normal operation of the machine, the refrigerant is drawn into the cylinder as the piston recedes from the top and then compressed as the piston rises, and the compressed refrigerant is discharged through the outlet valve into the head and then out through the conduit 5. There is a compound valve movement in each normal operation of the exhaust valve. First the spring 32 partially collapses until the several discs abut against the stop 35. As the pressure becomes greater the warped discs begin to flatten out and the port is increased in size, giving a free lift condition, the pressure of gas from the cylinder opening the valve by straightening the discs a sufficient amount to give free passage of compressed gas. The springs 26 (Fig. 3) do not function in the normal operation of the machine but function only in the event that a slug, such as a slug of oil or the like, is forced through the valve. These springs are of material strength and may require, as in the example above given, 36 through to 45 pounds to displace the cage. The same thing is true of the form shown in Fig. 5.

There is only a small clearance for the discs between the valve seat and inverted seat, when the discs are in their normal warped condition, and, accordingly, it will be observed that a very slight compression of the spring is required until the upper flat disc 30 rests upon the stop 35. Due to this slight movement there is practically no noise. Upon continued and increased opening of the valve the warped discs flatten out, and, of course, this is a completely silent operation. The warped discs obviously need not completely flatten out on every stroke. The same action takes place in the form shown in Fig. 5. Thus a silent efficient valve is obtained and one which is not accompanied by difficult or "fussy" adjustments either in initial installation or after use.

The spring 32 holds the several discs in relatively tight relation to one another and holds the lowermost disc 30 on the seat 21. The warped discs are relatively stiff for their size and unless used with the light spring 32 require quite a delicate adjustment with no assurance that the adjustment will be maintained after use. In the present structure, however, use of the spring 32 provides what may be visualized as an automatic adjustment. The spring 32 automatically maintains a light tension upon the several superposed discs and no adjustment whatever is needed. Once an assembly is completed and sent out from the factory the valve will function properly over an indefinite period, with no adjustments or services required. Should the warped discs vary initially, or should they lose some of their tension after use, the spring 32 automatically compensates therefor. The example given above is set forth for the purpose of making the disclosure complete, and it is to be understood, however, that the invention is not limited to this example or to any part thereof, but to the contrary is to be construed with such breadth as falls within the scope of the claims appended hereto.

I claim:

1. An outlet valve for a compressor comprising, a valve seat, a second seat spaced from the valve seat, a plurality of superposed members between the seats, some of which are warped and adapted to collapse, the combined thickness of the superposed members when in warped condition being less than the space between the seats, and spring means for holding the members against the valve seat and away from the second seat and collapsible to an extent allowing the upper member to abut the second named seat at a pressure which is less than that required to collapse the warped members.

2. A valve structure for a compressor having a cylinder with a piston working therein, a member having a port extending therethrough and adapted to be positioned over the cylinder, a valve seat around the port, another seat spaced from the valve seat and opposed with respect thereto, a plurality of discs, some of which are warped, said discs being positioned between the seats and all movable bodily therebetween as a unit, the warped disc or discs adapted to collapse under pressure, and a spring collapsible by a relatively light pressure for holding the said plurality of discs on the valve seat.

3. A valve structure for a compressor having a cylinder with a piston working therein, a member having a port extending therethrough and adapted to be positioned over the cylinder, a valve seat around the port, another seat spaced from the valve seat and opposed with respect thereto, a plurality of discs, some of which are warped, said discs being positioned between the seats and movable bodily therebetween as a unit, the warped disc or discs adapted to collapse under relatively heavy pressure, a spring collapsible under relatively light pressure for holding the said plurality of discs on the valve seat, and guide means around the said plurality of discs.

4. A valve structure for a compressor or the like having a cylinder with a piston therein, a valve supporting plate adapted to be positioned over the cylinder having a port therein, a valve seat around the port, a disc for resting upon the valve seat to close the port, other discs superposed upon the first disc, some of which are warped and adapted to collapse under pressure, a second seat opposed with respect to the valve seat, said discs being movable as a whole between the valve seat and the second named seat, said warped discs being relatively stiff and a relatively light spring for holding the superposed discs against the valve seat with the first mentioned disc seating directly upon the valve seat.

5. A valve structure for a compressor or the like having a cylinder with a piston therein, a valve supporting plate adapted to be positioned over the cylinder having a port therein, a valve seat around the port, a disc for resting upon the valve seat to close the port, other discs superposed upon the first disc, some of which are warped and adapted to collapse under pressure, a second seat opposed with respect to the valve seat, said discs being movable as a whole between the valve seat and the second named seat, a spring for holding the superposed discs against the valve seat with the first mentioned disc seating directly upon the valve seat, and guide means surrounding the discs.

6. A valve structure for a compressor having a cylinder with a piston working therein, a valve supporting plate adapted to be positioned over the cylinder and having a port therein, a valve seat surrounding the port, a second seat opposed with respect to the valve seat, a plurality of sheet-like members positioned between the seats with one adapted to rest upon valve seat for closing the port, some of said members being warped and adapted to collapse under pressure, and a spring collapsible under a pressure which is light relative to the pressure required to collapse one of said sheet-like members for holding said members against the valve seat.

7. In a valve assembly for use in a compressor having a cylinder with a piston working therein, a valve supporting plate adapted to be positioned over the cylinder and having a port therein, a valve seat surrounding the port, a second seat opposed with respect to the valve seat, a plurality of sheet-like metal members positioned between the seats with one adapted to rest upon valve seat for closing the port, some of said members being warped and adapted to collapse under pressure, a spring collapsible under a pressure which is light relative to the pressure required to collapse one of said members for holding said members against the valve seat, means backing up said spring, said last named means comprising spring means collapsible under a pressure substantially greater than that required to collapse one of said sheet-like members.

8. In a valve assembly for use on a compressor cylinder, a valve plate for attachment to the end of the cylinder and having a port therein, said valve plate having a valve seat around the port, a valve structure comprising a sheet metal disc for resting upon the valve seat and other sheet metal discs superposed thereon, some of which are warped and adapted to collapse under pressure, a second seat opposed to the valve seat, said discs being shiftable between the said two seats, a spring for holding the discs tensioned together with the first mentioned valve disc resting upon the valve seat, and with all of said discs spaced from the second mentioned seat, said spring being relatively light whereby when said spring is flexed by fluid pressure against the valve structure, the discs are shifted from the valve seat against the second named seat and the warped discs adapted to partially collapse under said pressure.

9. In a valve assembly for use on a compressor cylinder, a valve plate for attachment to the end of the cylinder and having a port therein, said valve member having a valve seat around the port, a valve structure comprising a sheet metal disc for resting upon the valve seat and other sheet metal discs superposed thereon, some of which are warped and adapted to collapse under pressure, a second seat opposed to the valve seat, said discs being shiftable between the said two seats, a spring for holding the discs tensioned together with the first mentioned valve disc resting upon the valve seat, and with all of said discs spaced from the second mentioned seat, said spring being relatively light whereby when said spring is flexed by fluid pressure against the valve structure, the discs are shifted from the valve seat against the second named seat and the warped discs adapted to partially collapse under said pressure, and relatively heavy spring means for backing up the said light spring.

10. A valve structure for a compressor or the like comprising, a valve seat, a second seat opposed and inverted with respect thereto, a plurality of superposed discs between the seats all shiftable bodily therebetween and one arranged to rest upon the valve seat, the combined dimension through the discs being less than the distance between the seats, some of the discs being warped and adapted to collapse under relatively heavy pressure, and a relatively light spring for holding the discs against the valve seat and away from the said opposed seat.

11. In a valve for a compressor or the like having a compressing cylinder, a valve plate adapted to be positioned at one end of the cylinder and having a port therein surrounded by a seat, a valve structure comprising a plurality of superposed members, one of which is adapted to rest upon the seat to close the port, some of the other members being warped and adapted to collapse under pressure, means on the opposite side of the superposed members from the plate including a spring acting upon the members to urge the said one member against the seat, said spring being collapsible by a pressure relatively light as compared to the pressure required to collapse the warped members, whereby when the spring is flexed by pressure against the valve structure the members are shifted as a unit from the valve seat, the said means being arranged to stop said shifting of the members away from the valve seat whereby the warped discs may partially collapse subsequent to the flexing of said spring.

WILLIAM W. HIGHAM.